Patented Jan. 17, 1933

1,894,567

UNITED STATES PATENT OFFICE

GEORGE JAMES MANSON, OF HAWKESBURY, ONTARIO, CANADA, ASSIGNOR, BY MESNE ASSIGNMENTS, TO MANSON CHEMICAL COMPANY, OF MONTCLAIR, NEW JERSEY, A CORPORATION OF NEW JERSEY

FIBROUS PRODUCT

No Drawing. Original application filed July 8, 1926, Serial No. 121,261. Divided and this application filed April 25, 1927. Serial No. 186,603.

This invention relates to improvements in water proofed fibrous products, such as paper or fibre board, and the objects of the invention are to provide such a product as may be manufactured at low cost and without disturbances of the usual technical process by which the paper, fibre board or the like is manufactured.

This is accomplished by the use of an improved waterproofing agent produced in the manner described in my co-pending application Serial No. 121,261, filed July 8th, 1926, of which the present application is a division.

In emulsions of the character to which this invention refers, it is desirable that the emulsions when formed should be freely diluted with water, and to this end that the individual particles of wax should be thinly coated with the emulsifying medium so that their bulk will not be unduly increased, and the particles remain in discrete form without any tendency to tackiness. I have found that it is possible to form a thin but sufficient coating about the particles of wax by forming a gel in the emulsified mixture rather than by adding a preformed emulsified agent thereto.

Such a gel may be formed by a variety of compounds, as for example by combining a water soluble acid salt with a silicate, the reacting of which is preferably caused to take place while being mixed with the molten wax while the whole mass is agitated and/or in rapid motion.

Of water soluble electrolytes which may be used I may mention magnesium chloride, magnesium sulphite, aluminum sulphate, calcium chloride, or other electrolytes of a similar nature. Sodium silicate may be conveniently used as a silicate to form the gel or gelatinous coating material. The method is applicable to wax which may be animal, mineral or vegetable wax, as well as the emulsification of these ingredients with themselves or with wax.

In practicing the method, the wax or other water repellent material is melted and mixed with water containing in solution the sodium silicate. The solution of an electrolyte or electrolytes is then added, of the character above described, and the mixture stirred, the temperature being above the melting point of wax or other water repellent substance, whereby the gel formed in the mixture will form an insoluble encysting coating about the particles of wax or other water repellent substance to maintain the wax or water repellent substance in discrete form when the mixture cools.

The following may be taken as practical examples of methods of making the emulsion:

Example I 100 pounds of Montan wax (a water repellent substance) is melted and 8 pounds of sodium silicate (a water soluble substance) is added in 120 pounds of water; this solution is heated to about 10° above the melting point of Montan wax; the mixture of melted Montan wax and the solution of sodium silicate is then rapidly stirred and 4½ pounds of magnesium sulphate (a water soluble material) dissolved in 40 pounds of water is added. A gel is immediately formed about the particles of Montan wax, keeping them from coalescing together when the mixture cools. It will be seen that by this means the wax is maintained in a finely divided state and in a condition which enables it to be readily disseminated through any material with which it is to be used.

Example II 33.0% paraffin wax
4.0% silicate of soda —plus— (65% of the total water).
2.0% alum—plus—(35% of the total water)
1.0% glue—(added to silicate of soda)
60.0% water The silicate of soda is added to the melted wax in a disintegrator and the alum is added after thorough agitation. Working temperature 170° F.

Example III 32.5% paraffin wax
0.85% Montan—(melted with wax)
5.0% silicate of soda—plus—(65% of the total water)
2.75% alum—plus—(35% of the total water)
0.4% glue—(added to silicate of soda with 1% phenol based on glue)
58.5% water The silicate of soda is added to the melted wax in a disintegrator and the alum is added after thorough agitation. Working temperature 170° F.

Example IV 31.0% paraffin wax
7.0% Montan—(melted with wax)
2.65% silicate of soda—plus—(65% of the total water)
1.35% alum—plus—(35% of the total water)
58.0% water The silicate of soda is added to the melted wax in a disintegrator and the alum is added after thorough agitation. Working temperature 170° F.

The mixture or emulsion may be used to waterproof paper or textile materials. In waterproofing paper, the mixture may be added to the beater with or without waterproofing agents and coagulating agents.

Alum, for instance, may be added to complete any coagulating effect required. Owing to the peculiar modifying qualities of the encasing or encysting mineral precipitate on the wax particle (which may be attributed to the method of forming the wax dispersion) so great a proportion of alum as is customarily employed with, for example, resin size, need not be used in the practice of the preferred form of the present invention.

The method may be applied in a similar way to other fibrous products than paper.

As many changes could be made in the above method and many apparently widely different embodiments of my invention, within the scope of the claims, constructed without departing from the spirit or scope thereof, it is intended that all matter contained in the accompanying specification may be interpreted as illustrative and not in a limiting sense.

In companion co-pending application, Serial No. 186,601, filed April 25, 1927, there is claimed methods of making paper products by incorporation of paper pulp with gel encysted water-repellent substances in finely divided condition.

What I claim as my invention is:

1. As a new article of manufacture, a fibrous product made from a pulp carrying a dispersion of gel-encysted water-repellent substance.
2. Stock from which fibrous products are to be produced, said stock carrying a gel coated water repellent substance.
3. Pulp from which fibrous products are to be produced, said pulp carrying a dispersion of a gel-encysted water repellent substance.
4. Stock from which fibrous products are to be produced, said stock carrying a dispersion containing an encysted water repellent substance and glue.
5. Stock from which fibrous products are to be produced, said stock carrying a gel-encysted water repellent substance and glue.
6. Pulp from which fibrous products are to be produced, said pulp carying a water repellent substance, glue, and a preservative for the glue.
7. As a new article of manufacture, a fibrous product produced from a pulp incorporated with a dispersion of a water-repellent substance simultaneously dispersed in an aqueous medium while encysting said water-repellent substance with a precipitated gel formed by double decomposition.
8. As a new article of manufacture, a fibrous product produced from a pulp incorporated with a dispersion of a wax simultaneously dispersed in an aqueous medium while encysting said wax with a precipitated gel formed by double decomposition.
9. As a new article of manufacture, a fibrous product produced from a pulp incorporated with a dispersion of a water-repellent substance simultaneously dispersed in an aqueous medium while encysting said water-repellent substance with a precipitated gel formed by double decomposition, and coagulated therein.

In witness whereof I have hereunto set my hand.

GEORGE JAMES MANSON.